(12) United States Patent
Reddin et al.

US008200535B1

(10) Patent No.: US 8,200,535 B1
(45) Date of Patent: Jun. 12, 2012

(54) METHODS AND SYSTEMS FOR OCCASION-BASED LIFESTYLE MARKETING

(75) Inventors: Thomas J. Reddin, Atlanta, GA (US); Glenda M. Behrle, St. Louis, MO (US); Robert J. Gfeller, Roswell, GA (US); Laurel M. Kimbrough, Atlanta, GA (US); Rodney D. Tabert, Roswell, GA (US); Thomas C. McThenia, Jr., Norcross, GA (US); Daniel J. Warren, Atlanta, GA (US)

(73) Assignee: The Coca-Cola Company, Atlanta, GA (US)

(*) Notice: Subject to any disclaimer, the term of this patent is extended or adjusted under 35 U.S.C. 154(b) by 819 days.

(21) Appl. No.: 09/296,120

(22) Filed: Apr. 21, 1999

(51) Int. Cl.
*G06Q 30/00* (2012.01)
(52) U.S. Cl. ............... 705/14.66; 705/14.49; 705/14.51; 705/14.53; 705/14.67; 705/14.73; 705/7.29; 705/7.31
(58) Field of Classification Search .................... 705/14, 705/7.29, 7.31, 14.49, 14.51, 14.53, 14.66, 705/14.67, 14.73
See application file for complete search history.

(56) References Cited

U.S. PATENT DOCUMENTS 5,649,114 A * 7/1997 Deaton et al. .................... 705/14
5,974,396 A * 10/1999 Anderson et al. ................ 705/14
5,999,908 A * 12/1999 Abelow ......................... 434/118

OTHER PUBLICATIONS

Lena h. Sun "Checking Out the Customer", Washington Post : Jul. 9, 1989.*
Kotler, Philip, "Marketing Management-Analysis, Planning, Implementation and Control": Sith Edition.*
The Coca-Cola Company, Presentation, Shop Refreshed—"The Balanced Budgets of Nancy Jones" 1955.
The Coca-Cola Company, Advertisement, "Have a Fireside Picnic" Date Uncertain.
The Coca-Cola Company, Advertisement, "Things Go Better With Coke: Piping Hot Soup, Ice-Cold Coke—and any meal goes better" 1965.
The Coca-Cola Company, Advertisement, "Things Go Better with Coke: Things Go Smoother refreshed" 1964.
The Coca-Cola Company, Advertisement, "Things Go Better with Coke: Words and Music Go Better refreshed" 1964.
The Coca-Cola Company, Advertisement, "See You at the Beach" 1969.

* cited by examiner

*Primary Examiner* — Raquel Alvarez
(74) *Attorney, Agent, or Firm* — Sutherland Asbill & Brennan LLP

(57) ABSTRACT

A method for promoting the selection of an item to a predetermined type of consumer. The method includes the steps of determining representative activities of the predetermined type of consumer, determining representative uses of the item by the consumer during the representative activities, and creating demand for the item by the consumer based upon one or more of the representative uses of the item by the consumer during the representative activities.

48 Claims, 11 Drawing Sheets

DINNER TIME - QUICK MEAL SOLUTIONS

| | | |
|---|---|---|
| 310 | OCCASION - THE "WHEN" | Dinner |
| 420 | NEEDS - THE "WHY" | Meal Enhancer |
| 430 | SHOPPING METHODS - THE "HOW" | Quick Meal Solutions |
| 550 | OCCASION BASED SOLUTIONS | |
| 580, 560 | • BRAND | Cola Brand A<br>Diet Brand B<br>Other Soft Drink Brands C, D<br>Balance of Portfolio |
| 590, 560 | • PACKAGING | Single Serving Packages<br>Fountain Cups<br>Multipacks<br>2 Liter Bottles |
| 600, 570 | • MERCHANDISING | Product in Express Lane<br>Product in Prepared Foods Department<br>Product Bundled with Pizza<br>Product Bundled with Frozen Foods<br>Small Display in Perimeter/Express Checkout/Produce Department |
| 610, 570 | • MESSAGING | "Complete Your Dinner With Real Refreshment"<br>"Cola Brand A & Chicken"<br>"Cola Brand A & Deli Sandwiches"<br>"Cola Brand A Lasagna" |

Fig. 7

SHOP REFRESHED

| | | |
|---|---|---|
| 310 | OCCASION - THE "WHEN" | Shopping |
| 420 | NEEDS - THE "WHY" | Treat/Refreshment/Tide-Me-Over |
| 430 | SHOPPING METHODS - THE "HOW" | Stock-Up |
| 550 | OCCASION BASED SOLUTIONS | |
| 580 560 | • BRANDS | Cola Brand A<br>Diet Brand B<br>Other Soft Drink Brands C, D<br>Balance of Portfolio |
| 540 600 | • PACKAGING | Single Serving Packages<br>Fountain Cups<br>Single Cans |
| 600 570 | • MERCHANDISING | Cooler/Fountain at Entrance with or without greeter<br>Shopping Cart Caddies<br>Shopping baskets with Drink Holders<br>Product at Checkout<br>Outside Vending |
| 610 570 | • MESSAGING | "Shop Refreshed"<br>"Enjoy a Cold Cola Brand A While You Shop" |

Fig. 9

SOCIAL EVENTS

| OCCASION - THE "WHEN" | Social Events |
|---|---|
| NEEDS - THE "WHY" | Socializer/Relaxer/Meal Enhancer |
| SHOPPING METHODS - THE "HOW" | Stock-Up or Quick Mission |
| OCCASION BASED SOLUTIONS | |
| • BRANDS | Cola Brand A<br>Diet Brand B<br>Other Soft Drink Brands C, D<br>Balance of Portfolio |
| • PACKAGING | Multipacks<br>2 Liter Bottles |
| • MERCHANDISING | Movable/Modular Display<br>Lobby Display<br>End Cap Display<br>Beverage Isle<br>Product in Express Lane<br>Product in Video Department<br>Bakery Spot Display<br>Small Display in Perimeter/Express Checkout/Produce Department |
| • MESSAGING | "Cola Brand A & Barbecuing"<br>"Cola Brand A & Football"<br>"Cola Brand A & Summer" |

Fig. 10

DRIVE REFRESHED

| | | |
|---|---|---|
| 310 | OCCASION - THE "WHEN" | In Transit |
| 420 | NEEDS - THE "WHY" | Refreshment/Tide-Me-Over |
| 430 | SHOPPING METHODS - THE "HOW" | Gas & Go/Inside Pay |
| 550 | OCCASION BASED SOLUTIONS | |
| 580 560 | • BRANDS | Cola Brand A<br>Diet Brand B<br>Other Soft Drink Brands C, D<br>Balance of Portfolio |
| 590 560 | • PACKAGING | Single Serving Packagings<br>Fountain Cups<br>Single Cans |
| 600 570 | • MERCHANDISING | Gas Island Vending<br>Check-Out Counter Cooler<br>Inside Store Coolers |
| 610 570 | • MESSAGING | "Drive Refreshed With Cola Brand A" |

Fig. 11

SNACK TIME

| | |
|---|---|
| OCCASION - THE "WHEN" | Afternoon/After School Snacks |
| NEEDS - THE "WHY" | Refreshment/Tide-Me-Over/Energizer |
| SHOPPING METHODS - THE "HOW" | Quick Pick Up |
| OCCASION BASED SOLUTIONS | |
| • BRANDS | Cola Brand A<br>Diet Brand B<br>Other Soft Drink Brands C, D<br>Balance of Portfolio |
| • PACKAGING | Single Serving Packages<br>Fountain Cups<br>Single Cans |
| • MERCHANDISING | Snack Centers with Cooler and Snacks<br>Teen Zone Barrels |
| • MESSAGING | "Cola Brand A with Snacks"<br>"Snacking Time is Cola Brand A Time" |

Fig. 12

INTERNET USAGE

| | |
|---|---|
| OCCASION - THE "WHEN" | Surfing the Net |
| NEEDS - THE "WHY" | Refreshment/Energizer/Rejuvenation/ Meal Enhancer |
| SHOPPING METHODS - THE "HOW" | Stock Up and others |
| OCCASION BASED SOLUTIONS | |
| BRANDS | Cola Brand A<br>Diet Brand B<br>Other Soft Drink Brands C, D<br>Balance of Portfolio |
| PACKAGING | Single Serving Packages<br>Fountain Cups<br>Single Cans<br>Multipacks<br>2 Liter Bottles |
| MERCHANDISING | Web pages/e-commerce |
| MESSAGING | "Complete Your Dinner With Real Refreshment"<br>"Surf with Cola Brand A" |

Fig. 13

METHODS AND SYSTEMS FOR OCCASION-BASED LIFESTYLE MARKETING

TECHNICAL FIELD

The present invention relates to methods of doing business in the marketing field, and more particularly relates to methods for marketing a product based upon consumers' lifestyles, activities, and needs.

BACKGROUND OF THE INVENTION

The marketing of a product has long focused in part on two prongs or "purchase triggers": (1) availability and (2) price. Particularly in the context of a consumer product, the manufacturer and/or distributor seeks to have that product available to the consumer in as many purchasing environments as possible at a competitive price. For example, The Coca-Cola Company of Atlanta, Ga., expanded its business throughout the world under the motto of placing the Coca-Cola brands "within an arm's reach of desire." In other words, the Coca-Cola brands were to be available wherever and whenever a consumer may desire a beverage.

Current competition based on availability and price, however, is fierce for the sale of consumer products such as food products and beverages. Particularly in the context of the local supermarket or similar environments, competitive advantages based upon shelf space and price are providing ever-decreasing returns. Further, there also are a variety of competing product options and brands in such retail environments. As a result, current profit margins are extremely low for both the manufacturer and/or distributor of the beverages and for the owner/operator of the supermarket or other types of purchasing environments.

What is needed, therefore, are methods and systems for marketing a product without relying exclusively on price. In other words, the product may be promoted and marketed based upon a purchasing trigger that represents activity-based consumer solutions rather than only price. This purchasing trigger may be based upon the vast amounts of consumer marketing and lifestyle data that is routinely collected on modern consumers. There is also a need for methods and systems for marketing a product to distinguish and identify that product in relation to a use of the product.

SUMMARY OF THE INVENTION

The present invention provides a method for promoting the selection, sale, or provision of an item to a predetermined type of consumer. The method includes the steps of determining representative activities of the predetermined type of consumer, determining representative uses of the item by the consumer during the representative activities, and creating demand for the item by the consumer based upon one or more of the representative uses of the item by the consumer during the representative activities. These steps may be embodied in a computer-readable medium having computer-executable instructions.

The representative activities may be based upon a predetermined length of time. These activities may be determined by gathering and analyzing consumer lifestyle information. The representative uses of the item may be based upon gathering and analyzing consumer purchase information. Creating demand may include messaging promoting the item as addressing a need associated with the representative uses or the representative activities.

Specific embodiments include the selection of a home category manager as the predetermined type of consumer. In such a case, the representative activities may include wake up, breakfast, in transit to work, in transit to school, morning break, lunch, afternoon break, after school snack, after school sports, after work workout, dinner, social events, evening snack, and shopping. The item may be a beverage and the representative uses may include refreshment, lift, meal enhancer, socializer, re-hydration, relaxer, treat, and a tide-me-over. Creating demand for the item may then include messaging directed to the home category manager suggesting the use of the beverage as a meal enhancer with dinner. Alternatively, the messaging may suggest the use of the beverage as refreshment during shopping.

In another embodiment, the predetermined type of consumer may include blue-collar adults and teens. The representative activities may include after school, afternoon, and after work. The item may be a beverage and the representative uses may be refreshment, energy, and a tide-me-over. Creating demand for the item may then include messaging directed to the blue-collar adults and teens suggesting the use of the beverage as an energizer during the afternoon.

Creating demand for the item may include the selection of one or more brands of the item. If the item is a liquid or a beverage, the brands may include coffee; tea; water; fruit, vegetable and juice concentrates; fruit, vegetable and juice beverages; isotonic beverages; non-isotonic beverages; milk and milk byproducts; carbonated soft drinks; and soft drink concentrate. The item also may include one or more food brands.

Creating demand for the item also may include selection of packaging. The packaging may include immediate consumption or future consumption packaging. Creating demand for the item may include selection of merchandising. The merchandising may include bundling the location or the offering of the item with a different item along with messaging promoting the bundling. Creating demand for the item also may include selection of messaging. The messaging may include media advertising; print advertising; radio, television, satellite and cable broadcasting; Internet, e-mail, and computer transmissions; telecommunications; event-based marketing; and direct mail. The messaging also may include in-store and out-doors displays. The messaging may include the name of the item and the representative uses or representative activities.

The present invention may further include the step of determining an environment in which the item is offered. The environment may include a retail environment or a virtual environment. The present invention may further include the step of determining the manner in which the consumer selects the item in the environment. This manner in which the consumer selects the item may be determined by consumer intercept surveys or by transactional data. The manner in which the consumer selects the item may include a quick mission trip, a quick meal solution trip, and a stock-up trip.

A further embodiment of the present invention includes determining the effectiveness of an Occasion-Based Marketing campaign. The invention includes the steps of determining the number of the items selected within the purchasing environment during a first predetermined interval, determining the types of shoppers for the item, determining representative activities of the shoppers, determining representative uses for the item during the representative activities, deploying solutions within the purchasing environment to create demand for the item based upon the representative uses and the representative activities, determining the number of the items selected within the purchasing environment during a second predetermined interval, and determining the difference between the number of the items purchased during the first predetermined interval and the second predetermined interval. Further steps may include determining the average transaction amount and the average gross profit margin for the item. The invention also may determine the amount of money received based upon the difference between the number of the items purchased during the first predetermined interval and the second predetermined interval, the average transaction amount for the item, and the average gross profit margin for the item.

A further embodiment of the present invention may include a computer-readable medium having stored thereon a data structure. The data structure may include a first data field containing data representing one or more activities of a predetermined type of consumer, a second data field containing data representing one or more uses of an item by the predetermined type of consumer based upon the data representing one or more activities, and a third data field containing data representing one or more marketing solutions for the sale of the item to the predetermined type of consumer based upon the data representing one or more uses of the item.

A further embodiment of the present invention may provide a method for promoting the use of an item by a predetermined type of consumer. The method may include the steps of receiving and storing data corresponding to representative activities of the consumer, receiving and storing data corresponding to representative uses of the item by the consumer, determining a relationship between the data corresponding to the representative activities and the data corresponding to the representative uses of the item, and storing the relationship. The method may further include the steps of creating and storing messaging associating the item with the relationship, receiving and storing data corresponding to the conversion rate of the consumers in response to the messaging, and receiving and storing data corresponding to the average transaction amount and the average gross profit margin for the item. The present invention also may determine the value of the messaging based upon the conversion rate, the average transaction amount for the item, and the average gross profit margin for the item.

A further embodiment of the present invention may provide a system for facilitating the use of an item by a predetermined type of consumer. The system may include a storage device and a processor connected to the storage device. The storage device may store a program for controlling the processor. The storage device also may store data representing one or more activities of the predetermined type of consumer, data representing one or more needs, and data representing one or more marketing solutions promoting the use of the item by the predetermined type of consumer. The processor also may be operative with the program to receive a request for the marketing solutions based upon the activities or the needs of the consumer and to provide the marketing solutions.

Other objects, features, and advantages of the present invention will become apparent upon review of the following detailed description of the preferred embodiments of the invention, when taken in conjunction with the drawings and the appended claims.

BRIEF DESCRIPTION OF THE DRAWINGS

FIG. 7 is a flow chart showing a Quick Meal Occasion-Based Marketing solution.

FIG. 9 is a flow chart showing a Shop Refreshed Occasion-Based Marketing solution.

FIG. 10 is a flow chart showing a Social Activities Occasion-Based Marketing solution.

FIG. 11 is a flow chart showing a Drive Refreshed Occasion-Based Marketing solution.

FIG. 12 is a flow chart showing a Snack Time Occasion-Based Marketing solution.

FIG. 13 is a flow chart showing an Internet Usage Occasion-Based Marketing solution.

DETAILED DESCRIPTION OF THE INVENTION

The present invention is directed towards useful processes and methods for promoting the sale of an item based upon various "occasions" within the life of a typical consumer. These processes and methods have practical, real world applications as is required for patentability under the precedent of *State Street Bank & Trust Co.* v. *Signature Financial Group, Inc.*, 149 F.3d 1368 (Fed. Cir. 1998). Specifically, the present invention provides the analytical tools for creating solutions including advertising and promotions ideally suited for addressing or targeting a consumer's needs for or uses of a particular item during these occasions. The processes and methods of the present invention may be implemented manually, via a conventional personal computer and database, or, alternatively, in combination of the two.

Figure 1:
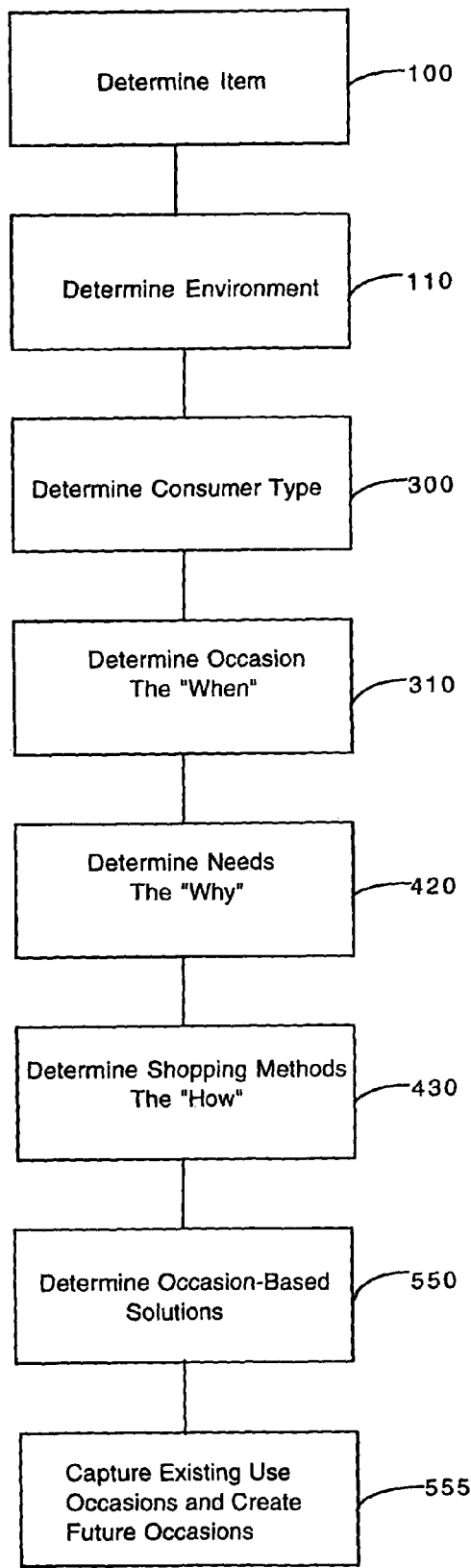
FIG. 1 is a flow chart showing the major steps of the present invention.

Referring now to the drawings, in which like numerals refer to like steps and elements throughout the several views, FIG. 1 is a block diagram showing the major steps of the present invention. The present invention includes consideration of a consumer's occasions or activities including those occasions for the potential use of the item (the "when"), why these activities may result in the use of or the need for a particular item or type of item (the "why"), and how the consumer shops for the particular item or items (the "how"). Based upon the data created or gathered in some or all of these steps and the analysis of this data, various Occasion-Based Marketing solutions may then be employed in, around, or outside of the environment in which the consumer purchases the item or items (the "solution"). The result of these Occasion-Based Marketing solutions is an increase in both consumption occasions or use occasions and purchase occasions. For example, with edible or consumable products or ingredients such use occasions may include consumption of the product such as a beverage or use of the product, such as a beverage concentrate in creating another edible product such as a finished beverage.

The Item

The determination of a particular item 10 or items to be promoted is made in step 100. The item 10 may be any type of product or service. In the embodiments of the present invention, the item 10 is preferably a beverage 20 and/or concentrate such as a carbonated soft drink sold under the Coca-Cola® brand name by The Coca-Cola Company of Atlanta, Ga. Any beverage 20 would be suitable in this embodiment. The preferred beverages 20 may include coffee, tea, waters, fruit, vegetable and other juice concentrates and/or beverages, isotonic beverages, non-isotonic beverages, and milk and milk-based products. Although any type of product or service may be used, consumer-oriented products are preferred. These products are preferred because of the existing knowledge and information on consumer lifestyle and purchasing habits and, more importantly, the knowledge of how this information may be obtained and analyzed.

The Environment

The determination of the purchase environments for the item 10 is made in step 110. This step includes an analysis of those locations where a consumer may have an opportunity to purchase, select, gain access to, or use the item 10. A purchase environment is considered to be any environment, actual or virtual, in which a consumer may use, purchase, or gain access to an item. The different types of relevant purchase environments for the particular item 10 are generally well known to those skilled in the art of marketing the item 10, i.e., most manufacturers and/or distributors understand the makeup of their applicable market. Other means of determining the applicable environment include a comprehensive analysis of all consumer "access points" that take place outside of traditional retail outlets, e.g., colleges, at work, in-transit, high schools, etc.

Figure 2:
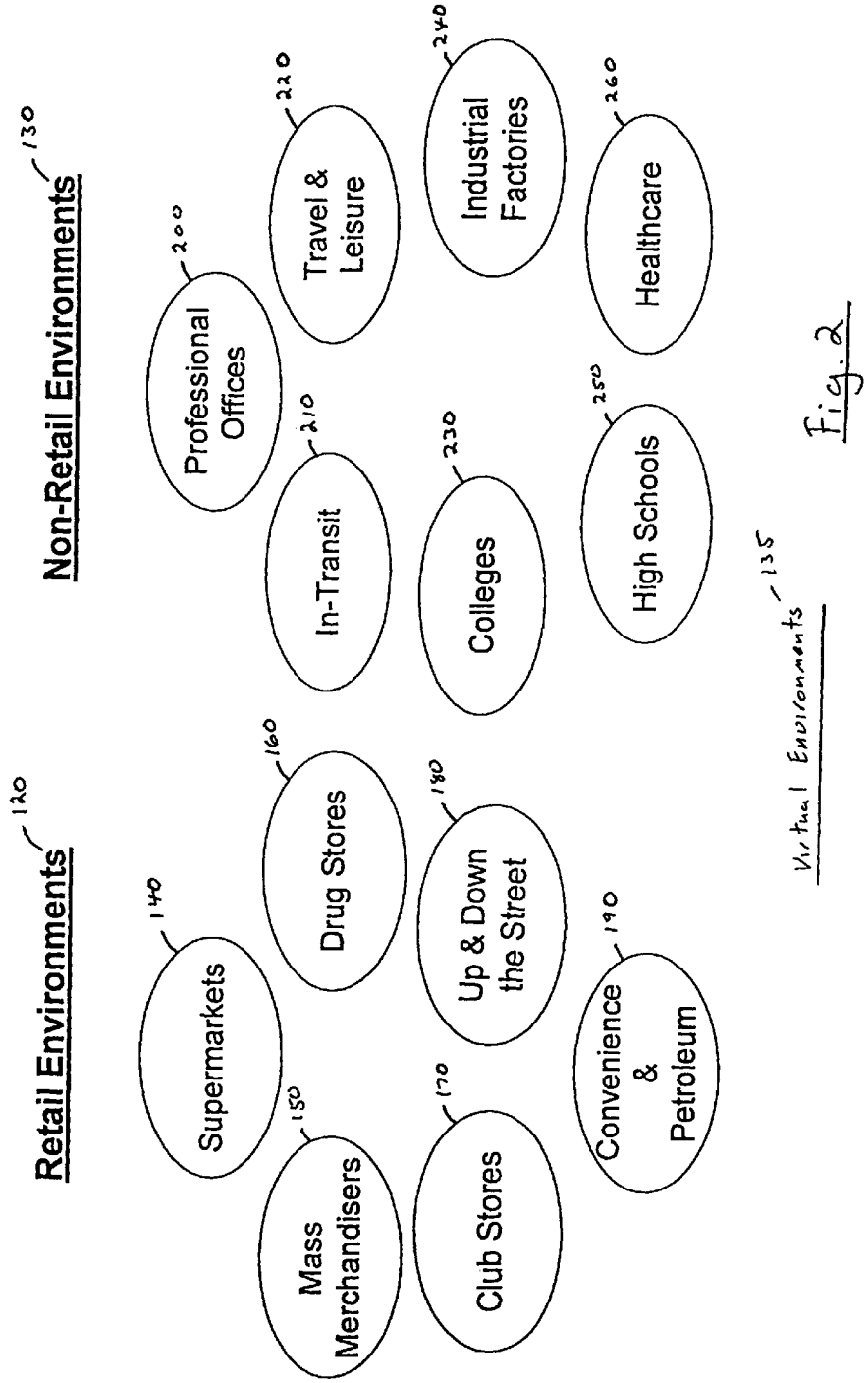
FIG. 2 is a listing showing different exemplary environments for the purchase of an item.

Depending upon the nature of the item 10, the purchase environments may include retail environments 120, non-retail environments 130, and virtual environments 135 as is shown in FIG. 2. Each of these environments 120, 130, 135 may then be broken down into sub-categories. In the case of the beverage 20, the retail environments 120 may include supermarkets 140, mass merchandisers 150, drug stores 160, club stores 170, "up and down the street" travel 180, and convenient stores and petroleum stations 190. The non-retail environments 130 for the beverage 20 also may be broken into sub-categories. These sub-categories may include professional offices 200, in transit 210, travel and leisure 220, colleges 230, industrial factories 240, high schools 250, and health care 260.

The virtual environment 135 may reside within a conventional distributed network, such as the Internet, a LAN, a WAN, or more than one interconnected networks. The consumer may communicate with the distributed network through a conventional personal computer or other electronic device configured with hardware and software for connecting to the distributed network via a modem, a direct network connection, or any other means of communicating with the resources of the distributed network. In addition, the consumer may be equipped with application software for allowing interaction with the services offered over the distributed network. For instance, browser software for interpreting web pages received via the distributed network. Also, the consumer may use other communication means, such as electronic mail (e-mail) applications, File Transfer Protocol (FTP) applications, and other file transfer applications, satellite, facsimile, and other telecommunications equipment, and the like, to interact with other the resources offered via the distributed network.

In the example of the virtual environment 135, the consumer may shop for the item 10 via a web page. For example, the web page may be a virtual supermarket offering all of the goods normally associated with the supermarket 140 or the web page may be devoted to the item 10 itself. The consumer may access the web page by hyper-links, by on-screen banner advertising, or by other conventional means.

The Consumers

Referring again to FIG. 1, after the item 10 of step 100 and the environment of step 110 are evaluated, the types of consumers that typically purchase the item 10 in each selected environment are considered in step 300. Modern marketing practice routinely divides the consumer universe into different types of consumers with similar purchasing habits. Extensive demographic, socioeconomic, and psychographic information is obtained to categorize these different types of consumers and to determine their purchasing preferences and motivations. The manner in which this information is gathered and analyzed is well known to those skilled in marketing techniques.

For example, information may be obtained via consumer intercept surveys in the different types of purchasing environments. Other methods include an analysis of transaction data, i.e., the analysis of sales information from checkout counter bar code readers on consumer purchases or from audit data. This information may include what is purchased, cost, frequency, time, amount, combinations of items, marketing or promotional activities or materials, etc. Further methods of determining the relevant types of consumers and their practices include one-on-one in-depth interviews with consumers, qualitative focus groups and quantitative consumer segmentation studies, i.e., segmenting consumers by their "nature of work."

Based upon this data, different consumer types are categorized according to their respective purchasing practices. For example, the largest category of shoppers in the supermarket 140 environment tend to be the typical working or non-working homemaker or parent with the primary responsibility for shopping and food preparation. In marketing terms these consumers are described as "Home Category Managers". The Home Category Manager category may account for about seventy to eighty percent of the traffic for the typical supermarket 140. By contrast, the relevant consumers for convenient stores and petroleum stations 190 may include blue-collar young adults, teens, and white-collar adults. The relevant consumers for the virtual environment 135 may include adults and teens with a variety of levels of computer experience. Each of the different shopping environments determined in step 110 generally will have a somewhat different consumer mix determined in step 300.

The When

After the relevant types of consumer for each environment are determined, the lifestyles and activities or the "occasions" of each type of consumer are determined in step 310 (the "when" step). Each of the different consumer types generally will engage in different types of activities at different times. These "occasions" may be considered on a "day in the life" basis, i.e., what a particular consumer type does in a representative time period such as on a daily basis, on a weekly basis, on a seasonal basis, or on any other timetable.

This consumer lifestyle information is similar to the extensive demographic and socioeconomic consumer information gathered and analyzed in step 300. This information is generally gathered via quantitative attitude and usage studies as well as by quantitative segmentation studies.

Figure 3:
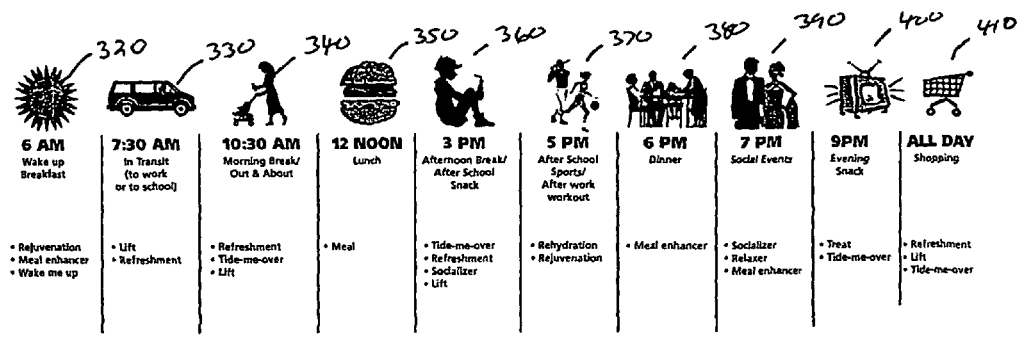
FIG. 3 is a diagram showing a representative time period: a day in the life of a Home Category Manager.

As is shown in FIG. 3, the activities of the typical Home Category Manager on a typical day may include the following: step 320, wake up and breakfast at about 6:00 a.m.; step 330, in transit to work or school at about 7:30 a.m.; step 340, morning break and out and about at about 10:30 a.m.; step 350, lunch at 12:00 p.m.; step 360, afternoon break and/or after school snack at about 3:00 p.m.; step 370, after school sports and/or after work workout at about 5:00 p.m.; step 380, dinner at about 6:00 p.m.; step 390, social events at about 7:00 p.m.; step 400, evening snack at about 9:00 p.m. Further, certain any time of the day activities also may be considered. For example, step 410, shopping.

The Why

Based upon each of these activities as determined for each type of consumer, the consumer's uses or needs (both functional and emotional) for the item 10 are determined in step 420 (the "why" step). The reasons for using or needing the item 10 or the "why" may be different for each type of consumer. The "whens" of step 310 should be comprehensive in nature so that all of the possible "whys" for a specific item 10 may be determined in step 420.

This information is also based largely on extensive demographic and socioeconomic consumer information similar to that gathered and analyzed in step 300 and elsewhere above. Further, this information may include item specific market research, i.e., information obtained by the manufacturer and/or distributor of the item 10 on how that item 10 is used and the needs addressed by the item 10. Other sources of this type of information include one-on-one in-depth interviews to uncover the emotional needs of the consumer, qualitative group research, and secondary research on changing consumers' needs.

For example, for each of the activities 320 through 410 of the typical Home Category Manager, the following needs for the beverage 20 have been determined. In the wake up and breakfast step 320, the typical Home Category Manager consumer may desire the beverage 20 as a "wake me up" drink, a rejuvenation drink, or as a meal enhancer. In the in transit to work or school step 330, the consumer may desire the beverage 20 for a lift or for refreshment. In the morning break and out and about step 340, the consumer may desire the beverage 20 for refreshment, for a lift, or for a "tide-me-over." In the lunch step 350, the consumer may desire the beverage 20 as a meal enhancer. In the afternoon break and/or after school snack step 360, the consumer may desire the beverage 20 as a tide-me-over, as refreshment, as a socializer, and as a lift. In the after school sports and/or after work workout of step 370, the consumer may desire the beverage 20 for re-hydration and rejuvenation. In the dinner step 380, the consumer may desire the beverage 20 as a meal enhancer. In the social events step 390, the consumer may desire the beverage 20 as a socializer, as a relaxer, or as a meal enhancer. In the evening snack step 400, the consumer may desire the beverage 20 as a treat or a tide-me-over. In the shopping step 410, the consumer may desire the beverage 20 as refreshment, as a lift, or as a tide-me-over.

The How

After the when of step 310 and the why of step 420 are determined for each consumer type for the particular item 10 in each environment, the manner in which that particular type of consumer shops in the environment maybe determined in step 430 (the "how" step). Consideration of the "how" focuses what the consumer may seek to accomplish, on how long the consumer is in the environment, where in that environment the consumer may shop, whether the consumer may purchase the item 10 for immediate or future use, or whether the consumer may purchase the item 10 for individual, family, commercial, or group use. Other considerations include how prepared the consumer may be for the shopping trip. For example in the supermarket 140, does the consumer have a shopping list, coupons, or a store circular.

This "how" information is also based largely on extensive demographic and socioeconomic consumer information similar to that gathered and analyzed in step 300 and elsewhere above. For example, this information may be obtained via consumer intercept surveys and by analysis of transactional information such as scanner or audit data. Other methods of gathering and analyzing this information include videotaping consumers' foot patterns throughout a shopping trip and qualitative "shop-with" interviews in which the researcher interacts with and experiences the shopping trip with the consumer.

Figure 4:
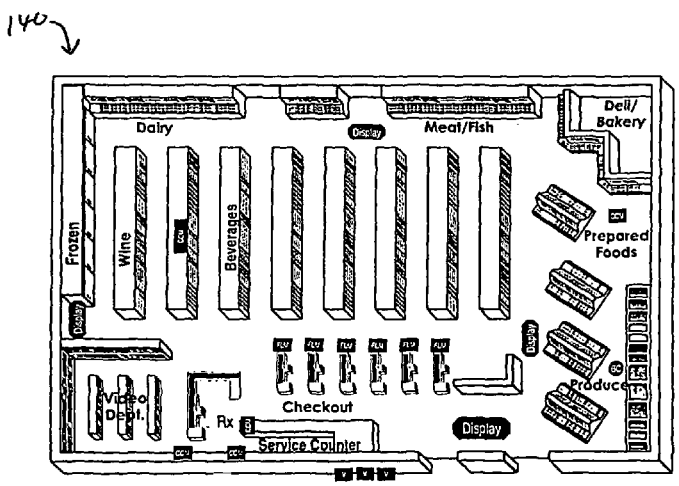
FIG. 4 is a diagrammatic representation of a typical supermarket.

Each type of environment generally will be arranged in a different manner so as to address the needs of its specific types of customers. As is shown in FIG. 4, the typical supermarket 140 will have different departments within the store that are organized for different types of shopping missions. For example, the typical supermarket 140 will generally include departments such as produce, prepare foods, deli/bakery, meat/fish, beverages, dairy, frozen, video, service counter, and checkout. These departments are organized and arranged so as to cater to different types of shopping missions.

Figure 5:
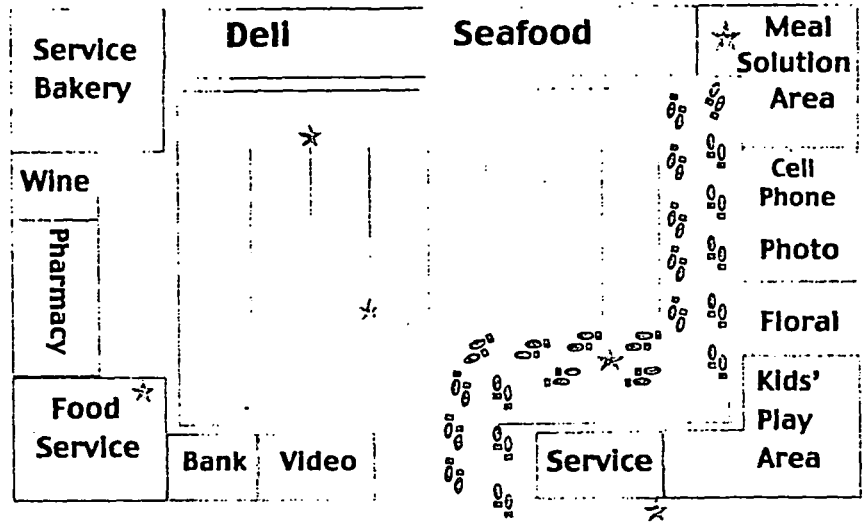
FIG. 5 is a diagrammatic representation of a Quick Meal solution trip.

The shopping missions within this environment may include immediate or future consumption trips. Each of these different types of shopping missions may take the consumer into different departments of the supermarket 140. For example, immediate consumption trips may include a "Quick Mission" trip focusing on the quick pick up of one or two items 10 or a "Quick Meal Solutions" trip focusing on the prepared foods area along with the deli/bakery to purchase the items 10 needed for a meal that day. FIG. 5 shows the typical path of a shopper on a Quick Meal Solution trip. As is shown, the shopper travels directly to the prepared foods or deli department and then directly to the checkout counter. Other areas of the environment, such as the beverage aisle, may be missed by the consumer during this type of shopping trip. Conversely, future consumption trips may include an "Unprepared Stock-Up" trip focusing on a shopper obtaining those items used week in and week out without a shopping list and a "Prepared Stock-Up" trip focusing on the shopper with a long list of items needed for an extended period of time. The consumer on the Stock-Up trips may travel through most of the various departments within the supermarket 140.

Figure 6:
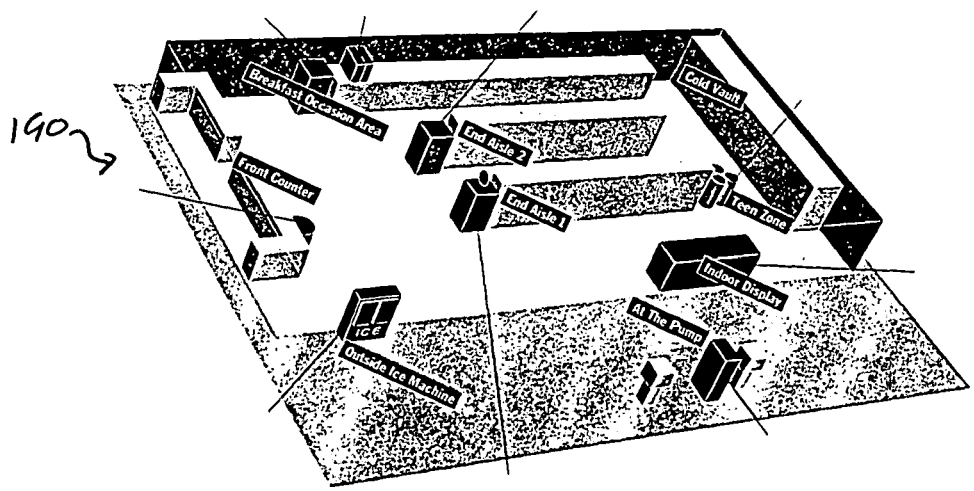
FIG. 6 is a diagrammatic representation of a typical convenient store or petroleum station.

As is shown in FIG. 6, the typical convenience store or petroleum station 190 also has different types of departments organized for different types of shopping missions. For example, a typical convenient store or petroleum station 190 will generally include departments or areas such as the pumps, the coolers, the food aisles, the checkout counter, and the outside ice cooler. Relevant shopping missions may include the "Get Up 'n Go" at about 7:30 a.m.; "Workin' Lunch" at about noon; "School's Out" at about 3:00 p.m.; and "Quittin Time" at about 5:30 p.m. Other trips may include "Gas and Go" trip in which the consumer fills up his or her car and pays at the pump without coming inside the store; the "Inside Pay" trip in which the consumer fills up his or her car and then pays for the gas inside; and the "Quick Pick Up" trip in which the consumer picks up snacks, beverages, or staple items. Again, each of these shopping missions may take the consumer into different departments within the convenience store or petroleum station 190.

The Solutions

Based upon the "when" of step 310, the "why" of step 420, and the "how" of step 430 (or any combination of these steps), the present invention leads to an Occasion-Based Marketing solution of step 550. The Occasion-Based Marketing solutions of step 550 combine and supplement traditional retail solutions 560 with consumer solutions 570. If the "whens" of step 310 are comprehensively determined, the Occasion-Based Marketing solutions 550 may be systematically determined so as to address each possible use or consumption occasion for the item 10 and also to prioritize these uses and occasions.

In the context of the beverage 20, the traditional retail solutions 560 include consideration of the appropriate brands 580 and the appropriate packaging 590. The appropriate brands 580 include, for example, those brands or types of the item 10 that appeal to the kind of consumer that shops in a given environment. For example, a low calorie carbonated soft drink may appeal to the Home Category Manager while a regular or sugared soft drink or a sports beverage may appeal to the teenage shopper. The appropriate packaging 590 focuses on providing the right size and shape for the item 10 for the particular customer and shopping mission. In the case of the beverage 20, for example, a single serving package may appeal to those consumers on a Quick Mission trip or a Quick Meal Solution trip while six-packs, twelve-packs, or two-liter bottles may appeal to those consumers on stock-up trips. In this example, other considerations include the temperature of the beverage 20. Depending upon the nature of the beverage 20, the packaging 590 intended for immediate consumption may be refrigerated while packaging 590 intended for future use may be stored at room temperature.

Selection of the appropriate brands 580, the appropriate packaging 590, and other types of traditional retail solutions 560 is based largely on the extensive demographic and socio-economic consumer information similar to that gathered in step 300 and elsewhere above. Other sources of information may include quantitative attitude and usage studies as well as packaging segmentation studies.

Another traditional retail solution 560 is the appropriate price for the item 10. As described above, although price is a fundamental purchase trigger, the price of the item 10 is not the primary focus of the present invention. Rather, the present invention seeks to motivate the consumer based upon the consumer's needs and uses of the item 10, i.e., how the consumer uses the item 10, as opposed to how the consumer purchases the item 10.

Specifically, the consumer solutions 570 of the present invention focus on creating a demand for the item 10 within the environment by suggesting how the item 10 serves a purpose or fulfills a need for the consumer. The item 10 may address this purpose or fulfill this need either at the present within the environment or in the future outside of the environment. The need may be emotional or functional. The consumer solutions 570 therefore include the appropriate merchandising 600 in combination with the appropriate messaging 610. The merchandising 600 and the messaging 610 are strategically placed within the environment so as to be relevant to the manner in which a particular type of consumer shops.

The appropriate merchandising 600 focuses on where in the environment the item 10 is located and how the item 10 is presented to the consumer. For example, the beverage 20 may be placed in the beverage aisle, in end-aisle displays ("end caps"), in lobby displays, and almost anywhere else within the environment. The item 10 also may be positioned, priced, and/or sold in combination with other items ("bundling"). Bundling creates a convenient solution for the consumer and an association in the consumer's mind between the respective items 10 that are sold together. For example, the beverage 20 may be sold together with a frozen pizza. The beverage 20 may be positioned directly adjacent to the frozen pizza freezer. This positioning has the advantage of creating an association in the consumer's mind between the two items 10 and also places the beverage 20 in an area of the environment that the consumer may not normally reach. In other words, the beverage 20 will be located in the frozen foods or prepared foods section of the supermarket 140 in addition to being located in the beverage aisle.

The messaging 610 also focuses on the uses of the item 10 by the consumer, particularly how the item 10 fulfills a need of the consumer. The messaging 610 includes both the substance of the message and the medium of the message. For example, the substance of the messaging 610 may explain how the beverage 20 may solve a consumer's emotional or functional need or how the beverage 20 serves a purpose. In the pizza example, the substance of the messaging 610 may be to create an association within the consumer's mind between the beverage 20 and the frozen pizza. This association may suggest the use of the beverage 20 as a meal enhancer with dinner.

The medium of the messaging 610 may take the form of in-store greeters, print advertising, outdoor signage, bill boards, and event-oriented signage such as in ballparks, stadiums, race tracks, parks, community centers, and the like. The messaging 610 also may take the form of radio, television, film, or Internet advertising, in store displays, banners, headers, and the like. The messaging 610 also may combine several types of media in one location. For example, an in-store display may include print advertising, sound, and video. The video may provide the messaging 610 by connecting the item 10 to the particular need or activity. Further, the messaging 610 may include any type of sensory experience, including the sense of smell. Studies have shown that both music and smell may have a significant impact of mood and stress reduction.

The messaging 610 also may be placed on the item 10 itself, on packaging or containers for the item 10, or on shelves, coolers, vending machines holding the item 10, or other types of dispensing mechanisms or systems. The messaging 610 also may be found on other branded products from other manufacturers/distributors aligned with the manufacturer/distributor of the item 10. In other words, any traditional form of advertising medium may be used. Alternative merchandising 600 and/or messaging 610 also may include merchandising devices or equipment, promotional items or contests, dispensing or product enhancement technology, and branded associated items such as a thermal can.

The present invention therefore goes beyond the traditional marketing strategy of availability and price, i.e., placing the item 10 "within an arm's reach of desire", to creating a need for the item 10 based upon the consumer's activities, i.e., to "create desire within arm's reach." The merchandising 600 and the messaging 610 therefore include both the item 10 itself and the consumer's uses and needs for the item 10. The present invention thus goes beyond such traditional marketing approaches by connecting the use of the item 10 to the specific needs of the consumer.

The Result

The culmination of the Occasion-Based Marketing solutions 550 is a capture and create step 555. The capture and create step 555 focuses on capturing the consumer's existing use occasions, i.e., when the consumer currently uses the item 10, and also to suggest and create future occasions. In other words, if the consumer has never thought of combining a beverage 20 with a frozen pizza, the Occasion-Based Solutions of step 550 may create such an occasion. By increasing demand for the use of the item 10, i.e., a consumption or use occasion, increased sales or use of the item, i.e., the purchase occasion, should follow. A purchase occasion may include any instance where a consumer may buy, gain access to, or use the item 10 regardless of whether a commercial transaction occurs. The increase in purchase occasions lead directly to increased value for both the manufacturer and/or distributor of the item 10 and the owner/operator of the local supermarket 140 or other purchase environment. Importantly, the Occasion-Based Marketing solutions 550 reflect the essence of the item 10 and build brand equity in the item 10 by connecting the functional and emotional benefits and uses of the item 10 to the consumption or use occasions.

Examples

Quick Meal Solutions

FIG. 7 shows the application of the present invention. In this example, the item 10 is the beverage 20, the environment is the supermarket 140, and the consumer is the Home Category Manager. Based upon the day in the life activities of FIG. 3, dinner is selected as the occasion or the "when" of step 310 with the accompanying need or the "why" of step 420 being a meal enhancer. The manner in which the Home Category Manager shops or the "how" of step 430 is divided into the Quick Meal Solutions trip and Stock-up trip. The Occasion-Based Marketing solutions 550 of the present invention are then directed towards these two types of shopping trips.

With respect to the Quick Meal Solutions trip, marketing studies conducted in association with step 430 show that the Home Category Manager needs quick, efficient, good quality, and complete beverage and meal solutions that he or she can feel good about serving to his or her family. This is particularly true today given the fact that about seventy-six percent (76%) of all women between the ages of 25 and 54 are working according to U.S. Bureau of Labor statistics. Further, the vast majority of consumers today plan their dinners at the last minute. According to a National Restaurant Association survey in 1997, about seventy percent (70%) of consumers do not know what they will have for dinner that day by as late as 4:00 p.m. Further, although about ninety percent (90%) of consumers drink a beverage with their meals, only a fraction of these consumers consider a beverage purchase when buying their meals. Specifically, only about eight percent (8%) consider a drink when they buy their meal according to a Home Meal Replacement study in 1997. In sum, the Home Category Manager on the Quick Meal Solutions trip is in a hurry, does not have a specific idea as to what to purchase, and needs to be reminded to purchase the beverage 20.

Based upon this consumer information, the solutions of step 550 are determined. First, the retail solutions 560 for the beverage 20 in the context of the Quick Meal Solutions trip are determined. Specifically, the appropriate brands 580 and the appropriate packaging 590 are determined. In this example, the packaging 590 focuses on both immediate consumption packaging, i.e., single items such as cans or fountain cups, and larger containers for future consumption such as take home use, i.e., multipacks of cans or two-liter bottles.

Figure 8:
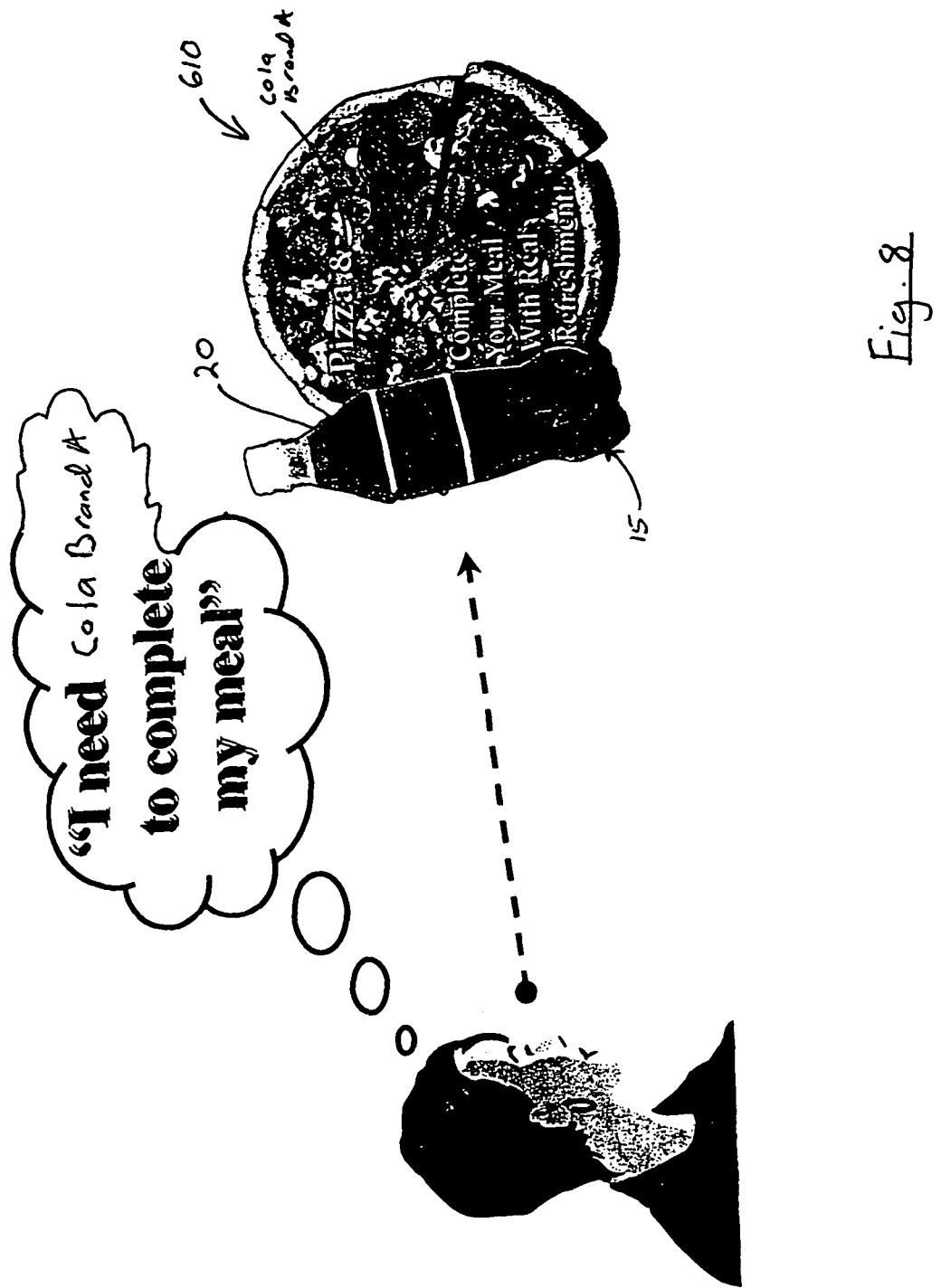
FIG. 8 is a message connecting the item to a consumer need.

Based upon the typical traffic pattern of the Quick Meal Solution trip as shown in FIG. 5, the merchandising 600 and the messaging 610 are placed in the direct path of the consumer, i.e., in the frozen foods section, in the prepared foods section, in the deli/bakery section, and elsewhere. For example; the merchandising 600 may include placing the beverage 20 directly adjacent to or within the frozen pizza section. The messaging 610 may then associate the beverage 20 with the fulfillment of the consumer's need, i.e., as a meal enhancer with the pizza dinner. As is shown in FIG. 8, the message 610 may read: "Pizza & Cola Brand A—Complete Your Meal With Real Refreshment!" Further, the supermarket 140 may use combination offers in which the pizza and the beverage 20 are sold for a set price to add convenience and value for the consumer. In other words, the supermarket 140 will bundle a pizza and a two-liter beverage 20 such as a carbonated soft drink for one price. The consumer is therefore motivated to purchase the beverage 20 because it fulfills the need for a meal enhancer with the pizza dinner. Further, the physical bundling of the beverage 20 and the pizza provides a great deal of convenience to the consumer.

Similar consumer solutions 570 for the Quick Meal Solution trip for the Home Category Manager may include merchandising 600 and messaging 610 bundling the beverage 20 with other types of frozen foods. Likewise, the beverage 20 may be bundled with any type of prepared foods or deli foods. The goal of the merchandising 600 is to have the beverage 20 in the immediate vicinity of these other items. The goal of the messaging 610 is to connect the use of the beverage 20 with the use of the other item, i.e., "Cola Brand A & Chicken", "Cola Brand A & Deli Sandwiches", or "Cola Brand A & Lasagna". The messaging 610 therefore explains to the consumer why the beverage 20 should be bought based upon the creation of solutions for the consumer's activities rather than promoting the item 10 merely on the basis of price.

The value of the present invention may be seen by research showing the increase in the consumer traffic in a particular environment, the increase in sales, and the increase in profit. For example, research has shown that the supermarket 140 may see a significant increase in the sale of the beverage 20 such as the carbonated soft drink by promoting the carbonated soft drink with the frozen pizza. Seventy-eight percent (78%) of average pizza units per store are currently sold without a beverage (according to the Progressive Grocer 1996 Annual Report concerning bottler reports). The Occasion-Based Marketing solutions of step 550 resulted in a twenty-five percent (25%) increase in the conversion rate or capture rate of step 555. In other words, twenty-five percent (25%) or more consumers bought a frozen pizza with a beverage 20. If the carbonated soft drink purchase price is about a $2.50 for a six-pack of half-liter bottles and the average gross margin is about 14.8%, the typical supermarket 140 may see an incremental increased profit of about $7853.00 per year.

Specifically, the value of the present invention may be shown as follows:

| Traffic # of Pizza Shoppers | Incidence Conversion % | Average Transaction Amount $ | Average Gross Margin % Per Transaction Gross Profit + Selling Price | $ Value $ |
| --- | --- | --- | --- | --- |
| 84,897 | 25% | $2.50 | 14.8% | $7853/Store/Year |

This calculation of incremental value added by the methods and systems of this invention may be utilized to analyze any solution provided by this invention.

Shop Refreshed

Another example of the present invention focuses on an any time of the day activity by the Home Category Manager, the shopping trip 410. As is shown in FIG. 9, the "when" of step 310 is shopping, the beverage need of the Home Category Manager during this activity, or the "why" of step 420, is for a treat, refreshment, or a tide-me-over. The type of shopping trip, or the "how" of step 430, may be the Stock-up trip. The typical consumer may spend an average of thirty (30) minutes or more on these Stock-Up trips.

The Occasion-Based Marketing solution 550 for this example is a "Shop Refreshed" program. This solution 550 includes traditional solutions 560 such as consideration of the brands 580 and the packaging 590. The packaging 590 in this example would focus on immediate consumption packages such as refrigerated single serving packages or fountain cups. The consumer solutions 570 may then include the appropriate merchandising 600 and the appropriate messaging 610. In this case, the merchandising 600 may include a cooler and a display positioned directly by the front entrance of the supermarket 140. The cooler is filled with the packaging 590 described above. The messaging 610 may include large banners or other display advertisements reading "Shop Refreshed with Cola Brand A" or similar messages offering the beverage 20 as a solution to the thirsty work of shopping. Given that it may seem unusual to consume the beverage 20 while the consumer is shopping, a greeter may be used to offer the beverage 20 to the consumer and to explain that it is acceptable and encouraged to consume the beverage 20 while shopping and to pay for it at checkout. Alternatively, additional types of messaging 610 may be used to convey this message. After the consumer has finished the beverage 20 and paid for it at checkout, a recycling bin may be available for the empty container.

A further aspect of the messaging 610 may include specially designed item containers or dispensers such as shopping cart caddies or shopping baskets to carry and support the beverage 20 while the consumer shops. An example of such a specially designed shopping basket with an integral bottle or can holder is shown in provisional U.S. patent application Ser. No. 60/091,739. The shopping carts or baskets themselves also may include messaging 610 promoting the beverage 20 as a solution to the thirsty work of shopping.

Studies have established that this type of Occasion-Based Marketing solution 550 may increase a supermarket's incremental profit on the sale of the beverage 20 by over $13,000 per year. For example, if the number of shoppers in the supermarket 140 is approximately 385,906 per year and only ten percent (10%) participate by obtaining the beverage 20 when entering the store, i.e., the capture of step 555, the supermarket 140 may see an increased profit of about $13,800 per year based upon an average price of about 89¢ per bottle and a 40% average gross margin per transaction.

Social Activities

FIG. 10 shows a further example of the present invention. In this case, the occasion or the "when" of step 310 is a social activity. The consumer's use or need for the beverage 20 or the "why" of step 420 is as a socializer, a relaxer, or as a meal enhancer. The nature of the shopping trip or the "how" of step 430 is either the Stock-up trip or the Quick Mission trip.

The Occasion-Based Marketing solutions 550 of this example focus on connecting the beverage 20 with consumer's needs during the social event. In this case, the packaging 590 may focus on future consumption packages such as multipack cans and two-liter bottles. The merchandising 600 will depend upon the nature of the social event. Social events may change seasonally and cover everything from football, baseball, barbecuing, or holidays. As such, the merchandising 600 may include a modular, moveable display event with visual promotions and products. This display then can be moved to the various supermarket departments depending upon the specific social event. For example, the display may be placed in the candy department during Halloween or in the meat department during barbecue season. The messaging 610 will tie the specific social event to the use of the beverage 20, such as "Cola Brand A & Barbecuing". Further, the beverage 20 also may be bundled with other products related to the social event.

Studies have established that this type of Occasion-Based Marketing solution 550 may increase a supermarket's incremental profit on the sale of the beverage 20 by more than $12,000 per year. For example, if the number of shoppers in the supermarket 140 that do not purchase a beverage during a weekly trip is approximately 5,173 and only ten percent (10%) participate by obtaining the beverage 20, i.e., the capture of step 555, the supermarket 140 may see an increased profit of about $12,312 per year based upon at an average price of $1.19 per six-pack and a 23.1% average gross margin per transaction.

Drive Refreshed

A further example of the present invention is shown in FIG. 11. In this case, the environment of step 110 is the convenience store or the petroleum station 190. The consumer of step 300 includes adults between the ages 18 and 49. The occasion or the "when" of step 310 is in transit. The consumer's use or need for a beverage or the "why" of step 420 is for refreshment. The manner in which the consumer shops is the Gas and Go trip with pay at the pump or the Inside Pay trip. In either case, the convenience store or the petroleum station 190 only has a matter of minutes to promote and sell the beverage 20.

The Occasion-Based Marketing solutions 550 of the present example remind the consumer to "Drive Refreshed" with the beverage 20. In this case, the packaging 590 is directed at immediate consumption such as refrigerated single serving bottles or cans. The merchandising 600 focuses on placing the beverage 20 either at the gas island itself or at the check out counter. The gas island merchandising 600 may include a vending machine that takes cash or credit cards. Further, the vending machine may be tied to the purchase of the gasoline such that the consumer can combine the purchases. The merchandising 600 inside the store may include one or more coolers positioned at the check out counter so as to encourage an impulse purchase. The messaging 610 may promote the beverage 20 as solving the consumer's need to be refreshed while driving, e.g., "Drive Refreshed With Cola Brand A."

Snack Time

FIG. 12 shows a further example using the convenience store or the petroleum station 190 environment. In this case, the consumer of step 300 includes blue-collar adults aged 18 through 34 and teens aged 13 through 17. The occasion or the "when" of step 310 is after school or after work and the needs or the "why" of step 420 include refreshment, energy, and a tide-me-over. The manner in which the consumer shops or the "how" of step 430 may be the "Quick Pick Up" trip, the "School's Out" trip, or the "Quittin Time" trip.

The Occasion-Based Marketing solutions of the present example remind the consumer to purchase the beverage 20 with the snacks. In this case, the packaging 590 is directed at immediate consumption such as refrigerated single serving bottles or cans. The merchandising 600 focuses on placing the beverage 20 in combination with various types of snacks. For example, a "snack center" may be used containing a cooler for the beverage 20 and shelves for different types of snacks. Further, a "teen zone" section of the store may have a barrel of cold beverages 20 such as carbonated soft drinks placed adjacent to the snack section or other youth related items. The messaging 610 would focus on tying the beverage 20 to the snacks, e.g., "Cola Brand A with Snacks" or "Snacking Time is Cola Brand A Time".

Internet Use

FIG. 13 shows a further example using the virtual environment 135. In this case, the consumer of step 300 includes teenagers, college students, and other computer-oriented adults. The occasion or the "when" of step 310 is "Internet Usage" and the needs or the "why" of step 420 includes refreshment, energy, rejuvenation, or a meal enhancer. The manner in which the consumer shops or the "how" of step 430 may be the Stock-up trip or many other variations.

The Occasion-Based Marketing solutions 550 of the present example may include almost any type of the appropriate brands 580 and the appropriate packaging 590. The merchandising 600 may focus on on-screen advertising of various types. The messaging 610 may remind the consumer to purchase the beverage 20 with the other items in his or her electronic shopping cart. For example, if the consumer is in a virtual supermarket or similar e-commerce entity, information on the consumer's purchase selections may cause the messaging 610 to appear. The direction of Internet advertising based upon a consumer's "clicks" or surfing habits is well known to those skilled in the art. This messaging 610 may be a banner or other types of on-screen advertising promoting the beverage 20.

As in the supermarket 140 example given above, the selection of a frozen pizza may cause the on-screen messaging 610 to appear tying the beverage 20 with the fulfillment of the consumer's need, i.e., a meal enhancer with the pizza dinner. Specifically, the message 610 may read: "Pizza & Cola Brand A—Complete Your Meal With Real Refreshment!" Similar messaging 610 also may be directed towards the consumer's needs while surfing, such as "Surf Refreshed with Cola Brand A."

IMPLEMENTATION

The present invention may be implemented in various ways. As is described above, the following steps all require considerable types and amounts of consumer marketing and lifestyle information:

determining the environment of step 110;
determining the type of consumer of step 300;
determining the occasion or the "when" of step 310;
determining the needs or the "why" of step 420; and
determining the shopping manner or the "how" of step 430.

The manner in which this information is gathered and analyzed is described in detail above. Regardless of how the data is obtained, the data from each step listed above may be stored with the Occasion-Based Marketing solutions of step 550 in one or more conventional interactive databases and manipulated by one or more conventional personal computers. The personal computer may include a processor and an input device. The database may be a memory storage device associated with the personal computer or the database may be a separate device. The personal computer and the database may be configured for the execution of a database management system. The database management system is operable for inserting, modifying and extracting data from the database and/or the memory storage device.

Specifically, the manipulation of at least the data concerning the "when" of step 310 with the "why" of step 420 provides the basis for the Occasion-Based Marketing solutions of step 550. Although, the Occasion-Based Marketing solutions of step 550 also may involve marketing creativity and artistic talent in conveying the messaging 610, the substance of the messaging 610 and the other aspects of the Occasion-Based Marketing solutions 550 are based upon the manipulation of the data of at least steps 310, 420, and perhaps other types of input such as data from step 430 concerning "how" the consumer shops.

Specifically, the flow charts in FIGS. 1, 7, 9-13 provide a detailed description of the process steps of the present invention. These flow charts are equivalent to a detailed schematic for an electrical circuit in that the flow chart blocks may correspond to actual computer instructions. Thus, the coding of the process steps of these flow diagrams into instructions for suitable commercially available computers is a mere mechanical step for one skilled in the programming arts.

Once the solutions of step 550 are developed and stored within the database, these solutions 550 may be used by the manufacturer and/or distributor of the item 10 to create advertising on a local, regional or national basis directed towards a specific type of consumer, a specific activity, and/or a specific product need. The manufacturer and/or distributor may create a number of Occasion-Based Marketing solutions of step 550 targeting various types of consumer activities and needs. These solutions may then be accessible, for example, to the operator of the local supermarket 140 via computer disk, tape drive, or other conventional data transfer media. Alternatively, the solutions 550 of the present invention may be accessible on-line or over the Internet. Any conventional data distribution system or network may be used. The local store owner/operator would then have a great deal of freedom in implementing the various Occasion-Based Marketing solutions 550 tailored to that specific environment while the national manufacturer and/or distributor is guaranteed a consistent advertising campaign. Likewise, the processes of the present invention could be used by the owner/operator of a single supermarket 140 or other environment. The operator could determine how to market the particular item 10 to suit a particular need or occasion.

Other computer based applications of the present invention include use by retailers or by others in alliance with a manufacturer/distributor of the item 10 to maximize the volume and revenue of all of their product categories beyond core products such as beverages. Additionally, there is significant opportunity to apply broadly these processes to Internet shopping once that channel becomes a significant portion of targeted industries such as the food and beverage industry.

It should be apparent that the foregoing relates only to the preferred embodiments of the present invention and that numerous changes and modifications may be made herein without departing from the spirit and scope of the invention as defined by the following claims.

We claim:

1. A method for promoting the selection of an item by a predetermined type of consumer based upon consumer lifestyle and consumer market data, said method comprising the steps of:

storing the consumer lifestyle and the consumer market data in a database;

storing a selection of messaging, brands, packaging, or merchandising associated with the item in the database;

determining one or more representative activities of said predetermined type of consumer based upon the consumer lifestyle data via a processor in communication with the database;

determining one or more representative uses of said item by said predetermined type of consumer during said one or more representative activities based upon the consumer market data via the processor in communication with the database;

determining an association between said one or more representative uses of said item by said predetermined type of consumer during said one or more representative activities and the selection of messaging, brands, packaging, or merchandising via the processor in communication with the database;

storing the association in the database; and providing access to the database and the association.

2. The method of promoting the selection of an item of claim 1, wherein said step of determining one or more representative activities of said predetermined type of consumer comprises analysis of said one or more representative activities within a predetermined length of time.

3. The method of promoting the selection of an item of claim 1, wherein said step of determining one or more representative activities of said predetermined type of consumer comprises analysis of the consumer lifestyle data.

4. The method of promoting the selection of an item of claim 1, wherein said predetermined type of consumer comprises a home category manager and wherein said one or more representative activities is an event selected from the group consisting of wake up, breakfast, in transit to work, in transit to school, morning break, lunch, afternoon break, after school snack, after school sports, after work workout, dinner, social events, evening snack, and shopping.

5. The method of promoting the selection of an item of claim 4, wherein said item comprises a beverage and wherein said one or more representative uses is a need selected from the group consisting of refreshment, lift, meal enhancer, socializer, re-hydration, relaxer, treat, and a tide-me-over.

6. The method of promoting the selection of an item of claim 5, wherein the selection of messaging comprises messaging directed to said home category manager suggesting use of said beverage as said meal enhancer with said dinner.

7. The method of promoting the selection of an item of claim 5, wherein the selection of messaging comprises messaging directed to said home category manager suggesting use of said beverage as said refreshment during said shopping.

8. The method of promoting the selection of an item of claim 1, wherein said predetermined type of consumer comprises blue-collar adults and teens and wherein said one or more representative activities is an event selected from the group consisting of after school, afternoon, and after work.

9. The method of promoting the selection of an item of claim 8, wherein said item comprises a beverage and wherein said one or more representative uses is a need selected from the group consisting of refreshment, energy, and a tide-me-over.

10. The method of promoting the selection of an item of claim 9, wherein the selection of messaging comprises messaging directed to said blue-collar adults and teens suggesting use of said beverage as said energizer during said afternoon.

11. The method of promoting the selection of an item of claim 1, wherein said consumer market data comprises consumer purchase information.

12. The method of promoting the selection of an item of claim 11, wherein said step of determining one or more representative uses of said item by said predetermined type of consumer during said one or more representative activities comprises analysis of said consumer purchase information.

13. The method of promoting the selection of an item of consumer of claim 1, wherein the selection of messaging comprises messaging promoting said item as addressing a need associated with said one or more representative uses.

14. The method of promoting the selection of an item of consumer of claim 1, wherein the selection of messaging comprises messaging associating said item with said one or more representative activities.

15. The method of promoting the selection of an item of claim 1, wherein the selection of brands comprises selection of one or more brands of said item.

16. The method of promoting the selection of an item of claim 15, wherein said one or more brands comprise predetermined beverage brands.

17. The method of promoting the selection of an item of claim 15, wherein said one or more brands of said item is a liquid selected from the group consisting of coffee; tea; water; fruit, vegetable and juice concentrates; fruit, vegetable and juice beverages; isotonic beverages; non-isotonic beverages; milk and milk byproducts; carbonated soft drinks; and soft drink concentrate.

18. The method of promoting the selection of an item of claim 15, wherein the selection of one or more brands comprises selection of one or more food and beverage brands.

19. The method of promoting the selection of an item of claim 1, wherein the selection of packaging comprises selection of a predetermined package.

20. The method of promoting the selection of an item of claim 1, wherein said packaging comprises immediate consumption packaging.

21. The method of promoting the selection of an item of claim 1, wherein said packaging comprises future consumption packaging.

22. The method of promoting the selection of an item of claim 1, wherein said merchandising comprises bundling the location of said item with a different item.

23. The method of promoting the selection of an item of claim 22, further comprising messaging promoting said bundling of said item with said different item.

24. The method of promoting the selection of an item of claim 1, wherein said merchandising comprises bundling the offering of said item with a different item.

25. The method of promoting the selection of an item of claim 24, further comprising messaging promoting said bundling of said item with said different item.

26. The method of promoting the selection of an item of claim 1, wherein said messaging comprises media advertising.

27. The method of promoting the selection of an item of claim 26, wherein said messaging is advertising selected from the group consisting of print; radio, television, satellite and cable broadcasting; Internet, e-mail, and computer transmissions; telecommunications; event-based marketing; and direct mail.

28. The method of promoting the selection of an item of claim 1, wherein said messaging comprises in-store displays.

29. The method of promoting the selection of an item of claim 1, wherein said messaging comprises out-doors displays.

30. The method of promoting the selection of an item of claim 1, wherein said messaging comprises the name of said item and said one or more representative uses.

31. The method of promoting the selection of an item of claim 1, wherein said messaging comprises the name of said item and said one or more representative activities.

32. The method of promoting the selection of an item of claim 1, further comprising the step of determining an environment in which said item is offered.

33. The method of promoting the selection of an item of claim 32, wherein said environment comprises a retail environment.

34. The method of promoting the selection of an item of claim 32, wherein said environment comprises a virtual environment.

35. The method of promoting the selection of an item of claim 32, further comprising the step of determining the manner in which said predetermined type of consumer selects said item in said environment.

36. The method of promoting the selection of an item of claim 35, wherein said step of determining the manner in which said predetermined type of consumer selects said item in said environment comprises consumer intercept surveys.

37. The method of promoting the selection of an item of claim 35, wherein said step of determining the manner in which said predetermined type of consumer selects said item in said environment comprises analysis of transactional data.

38. The method of promoting the selection of an item of claim 35, wherein said manner in which said predetermined type of consumer selects said item comprises a purchasing trip selected from the group consisting of quick mission trips, quick meal solution trips, and stock-up trips.

39. The method of promoting the selection of an item of claim 35, wherein the selection of messaging comprises displays located at a location distant from said environment.

40. A computer-readable medium having computer-executable instructions for performing the steps recited in claim 35.

41. A computer-readable medium having computer-executable instructions for performing the steps recited in claim 1.

42. A method for promoting the use of an item by a predetermined type of consumer, said method comprising the steps of:
- receiving consumer lifestyle data corresponding to representative activities of said predetermined type of consumer;
- storing said data corresponding to said representative activities of said predetermined type of consumer in a marketing database;
- receiving consumer market data corresponding to representative uses of said item by said predetermined type of consumer;
- storing said data corresponding to said representative uses of said item by said predetermined type of consumer in said marketing database;
- receiving a selection of messaging, brands, packaging, or merchandising associated with the item;
- storing the selection of messaging, brands, packaging, or merchandising associated with the item in said marketing database;
- determining a relationship between said data corresponding to said representative activities of said predetermined type of consumer and said data corresponding to said representative uses of said item by said predetermined type of consumer activities with the selection of messaging, brands, packaging, or merchandising via a processor in communication with the marketing database so as to increase demand of the item by the predetermined type of consumer; and
- storing said relationship in said marketing database.

43. The method for promoting the use of an item of claim 42, further comprising the step of creating messaging associating said item with said relationship.

44. The method for promoting the use of an item of claim 43, further comprising the step of storing said messaging in said marketing database.

45. The method for promoting the use of an item of claim 44, further comprising the steps of receiving data corresponding to a conversion rate of said predetermined types of consumers in response to said messaging associating said item with said relationship and storing said data corresponding to said conversion rate of said predetermined types of consumers in said marketing database.

46. The method for promoting the use of an item of claim 45, further comprising the steps of receiving data corresponding to the average transaction amount for said item and storing said data corresponding to said transaction amount in said marketing database.

47. The method for promoting the use of an item of claim 46, further comprising the steps of receiving data corresponding to the average gross profit margin for said item and storing said data corresponding to said average gross profit for said item in said database.

48. The method for promoting the use of an item of claim 47, further comprising the step of determining the value of said messaging via said processor based upon said conversion rate, said average transaction amount for said item, and said average gross profit margin for said item.

* * * * *